United States Patent Office 3,364,589
Patented Jan. 23, 1968

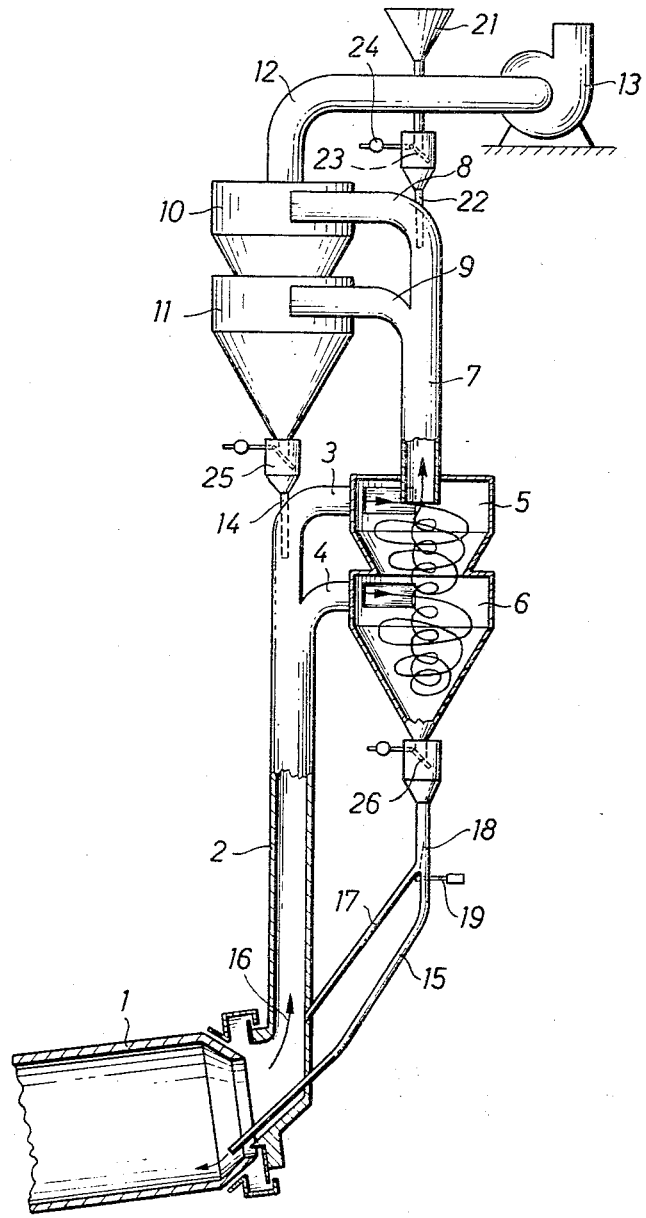

3,364,589
APPARATUS FOR PROVIDING DIRECT HEAT-EXCHANGE BETWEEN A PULVERULENT MATERIAL AND A GAS
Franz Muller, Bensberg-Refrath, Germany, assignor to Klockner-Humboldt-Deutz Aktiengesellschaft, Cologne-Deutz, Germany, a corporation of Germany
Filed Oct. 24, 1965, Ser. No. 504,305
Claims priority, application Germany, Nov. 4, 1964, K 54,438
8 Claims. (Cl. 34—57)

ABSTRACT OF THE DISCLOSURE

In an apparatus for providing direct heat exchange between a pulverulent material and a gas there is provided at least one heat-exchanging stage including at least two cyclone separators, one of which is an upper separator and the other a lower separator situated beneath the upper separator, the upper separator having a bottom open end directly communicating with a top open portion of the lower separator, a pair of gas inlet conduits respectively communicating tangentially with upper portions of the separators, a main gas conduit communicating with both of the gas inlet conduits and from which the gas inlet conduits branch, supply means for supplying pulverulent material at least to that gas inlet conduit which communicates with the upper separator, discharge means communicating with a lower end of the lower separator for discharging the treated pulverulent material therefrom, and suction means communicating with an upper portion of the upper separator for drawing gases out of the latter.

My invention relates to an apparatus for providing direct heat-exchange between a relatively fine pulverulent material and a gas.

In particular, my invention relates to that type of apparatus which is used in the heating of pulverulent cement raw material by means of the waste gas which issues from the rotary kiln in which the cement raw material is calcined.

There are known apparatus for heating cement raw material and including a plurality of dust separators, preferably cyclones, connected in series, one after the other, by gas conduits. These cyclones are arranged in such a way that by means of a blower the hot waste gases are drawn from a rotary kiln in sequence through the successive, individual cyclones. A discharge conduit for the pulverulent material is connected with each cyclone except the first, considered in the direction of gas flow, and each of these discharge conduits for the pulverulent material leads from one cyclone to the next-preceding cyclone, considered in the direction of gas flow, the pulverulent material being fed to the waste gas conduit which leads into the next-preceding cyclone. The discharge conduit for the pulverulent material issuing from the first cyclone, considered in the direction of gas flow, leads directly into the rotary kiln. Thus, the gas conduit which leads from one cyclone to the next cyclone in the direction of gas flow, receives the pulverulent material so as to direct the pulverulent material in suspension in the gas into a cyclone for intimate heat exchange with the whirling gases therein. Each cyclone thus forms a heat-exchanging stage of the apparatus and the pulverulent material progresses in countercurrent to the flow of gas so as to progressively be placed in engagement with hotter gases. This type of known apparatus thus makes it possible, with a minimum of apparatus and personnel, to provide an effective preheating of the cement raw material as well as simultaneously a partial calcination thereof, by deacidifying the raw material, so that in this way the heat content of the particular fuel which is used can be utilized in an economical manner.

It is a primary object of my invention to provide a direct heat exchange between a pulverulent material and a gas in such a way that a particularly effective heat exchange, far beyond what has heretofore been possible, can be achieved.

Also, it is an object of my invention to provide during part of the heat-exchange a very thorough deacidification, or calcination, of the cement raw material.

In particular, it is an object of my invention to provide an apparatus which requires only a relatively small number of treatment stages to achieve the desired extent of heat-exchange between a pulverulent material and a gas.

Thus, it is an object of my invention to provide an apparatus which is exceedingly compact, inasmuch as the space required for the apparatus of my invention is smaller than that required for conventional apparatus capable of achieving similar results.

Furthermore, it is an object of my invention to provide an apparatus which, when used for treating cement raw material, is capable of driving off a considerable amount of carbonic acid from the cement raw material before it reaches the rotary kiln.

In particular, with my invention there is provided at least one heat-exchange stage for providing direct heat exchange between a pulverulent material and a gas, and at each stage there are, in accordance with my invention, a pair of cyclone separators arranged one over the other so as to form an upper and a lower separator at each heat-exchanging stage. The upper cyclone at each stage is in open communication with the lower cyclone, and the pair of cyclones are fed with a pair of branches from a main gas conduit so as to receive the gases which whirl within the cyclones. The lowest cyclone of one stage has a discharge conduit for the pulverulent material feeding this material to the upper gas inlet conduit of the next stage.

According to a further feature of my invention, particularly in the case where a pulverulent cement raw material is heated with the waste gases issuing from a rotary kiln, the lowermost cyclone which forms part of the first stage, considered in the direction of gas flow, has at its discharge conduit for the pulverulent material a pair of branches one of which feeds into the gas conduit leading from the rotary kiln to the first treatment stage while the other leads directly into the rotary kiln. In this may part of the pulverulent cement raw material is recirculated back through the first treatment stage, so as to be brought into contact with the fresh gases issuing from the rotary kiln. In this way it is possible to achieve with my invention, simultaneously with the heat-exchanging treatment an extremely thorough deacidifying of the pulverulent cement raw material.

My invention is illustrated by way of example in the accompanying drawing which forms part of the application and in which there is schematically shown in a partly sectional elevation, one possible embodiment of an apparatus of my invention, the particular apparatus shown in the drawing being especially suited for the firing of pulverulent cement raw material.

In the particular example illustrated in the drawing, the firing of the pulverulent cement raw material into clinker takes place in the rotary kiln 1 which is conventional. The hot waste gases issue from the rotary kiln 1 at a temperature of, for example, 1000° C., and they are carried off through a main gas conduit 2. At its upper end this main gas conduit 2 branches into a pair of gas inlet conduits 3 and 4, which respectively lead into a pair of cyclones 5 and 6 which form the first heat-exchanging stage, considered in the direction of gas flow. Thus, the pair of gas inlet conduits 3 and 4 lead tangentially into upper portions of the pair of cyclone separators 5 and 6 which together form a single treating or heat-exchanging stage. The cyclone 5 is arranged over the cyclone 6 and forms an upper cyclone while the cyclone 6 forms the lower cyclone. This upper cyclone 5 terminates at its bottom end at the top of the lower cyclone 6, and a pair of cyclones 5 and 6 are coaxially arranged in open communication with each other. The second main gas discharge conduit 7 leads from the upper portion of the upper cyclone separator 5 to the next treating or heat-exchanging stage, considered in the direction of gas flow, and at its upper portion this main gas conduit 7 also is divided into a pair of branches 8 and 9. The branches 8 and 9, respectively, lead tangenitally into upper portions of a pair of cyclones 10 and 11 which are arranged with the cyclone 10 forming an upper cyclone situated over the lower cyclone 11, and in this case also the two cyclones 10 and 11 form a single treatment or heat-exchanging stage. It will be noted that in both stages the upper cyclones 5 and 10, respectively, have lower tapered portions which are of frustoconical configuration and which terminate directly in the top wall or cover of the lower cyclone. The gas discharge conduit 12 of the treatment stage 10, 11, leads directly into the suction inlet of a blower 13, and it is preferred to arrange in the path of flow from the conduit 12 to the inlet of the blower 13 an unillustrated dust-filtering or precipitating device.

The lower cyclone 11 of the treatment stage 10, 11 has a discharge conduit 14 through which the pulverulent material treated in the upper stage of the drawing issues to the next lower stage. This discharge conduit 14 for the pulverulent material feeds into the upper gas inlet conduit 3 of the first stage, so that the pulverulent material is introduced into the first treating stage suspended in the gas which flows in through the upper inlet conduit 3. The discharge conduit 15 for the pulverulent material issuing from the first stage, communicates with the lower cyclone 6 thereof and directs the treated pulverulent material directly into the rotary kiln 1 from which the gas issues in the direction of the arrow 16.

It will be noted that the discharge conduit which communicates with the bottom end of the lower cyclone 6 of the first stage includes a pair of branches one of which is formed by the conduit 15 which leads directly into the rotary kiln 1. The other branch 17 of the discharge conduit for the pulverulent material leads directly into the main gas conduit 2, preferably at the inlet end of the latter adjacent to the outlet of the rotary kiln 1, and a distributing valve 18 in the form of a tiltable plate is situated at the junction of the branches 15 and 17 so as to regulate the distribution of the pulverulent material between the branches 15 and 17. This tiltable distributing plate or valve 18 is connected with a handle 19 in the form of a lever accessible to the operator who can manually regulate the angular position of the distributing plate 18 so as to control the proportional distribution of the pulverulent material between the branches 15 and 17.

The gas inlet conduit 8 forming the upper branch of the main conduit 7 and leading to the upper cyclone 10 of the second stage, considered in the direction of gas flow, is in communication with a supply means which supplies the pulverulent cement raw material to the apparatus. This supply means includes a hopper 21 in which the raw material is placed, for example by an unillustrated bucket conveyor. A supply pipe 22 communicates with the outlet end of the hopper 21 and feeds directly into the upper gas inlet conduit 8 of the upper stage of the apparatus shown in the drawing. Preferably the pipe 22 is interrupted so as to have upper and lower portions, and the upper portion of the pipe 22 is provided with an inclined end against which a plate 23 is urged.

This plate 23 is supported for pivotal movement and is connected with a weighted lever, carrying the weight 24, which is shiftable along the lever so as to control the force with which the closure plate 23 is urged against the inclined bottom end of the upper part of the portions of the supply pipe 22. Thus, the weight 24 urges the closure plate 23 to its closed position, and the adjustment of the weight 24 is such that the pulverulent material will accumulate to a predetermined height in the upper portion of the pipe 22 above plate 23 pressing against the latter and tending to urge the plate 23 to its open position. In this way, the pulverulent material itself provides a closure to prevent the gas from passing upwardly through the supply pipe 22. The closure plate 23 will be displaced away from the bottom inclined end of the upper part of the supply pipe 22 only when the weight of the raw material accumulating on top of the plate 23 overcomes the force tending to maintain the plate 23 in its closed position. From the moment when the plate 23 is displaced away from a fully closed position, the pulverulent material will flow over the edge of the plate 23 in an amount which is equal to that which flows out of the hopper 21 into the pipe 22. Similarly tiltable closure plates 25 and 26 are provided to control the issuing of the treated pulverulent material from the discharge conduits of the two treating stages shown in the drawing.

Under the action of the blower 13, the hot waste gases which issue from the rotary kiln 1 upwardly through the main conduit 2, will reach the pair of gas inlet conduits 3 and 4 which will deliver approximately equal amounts of the hot gases into the cyclones 5 and 6. The gas which is sucked in this way into the pair of cyclones 5 and 6 is set into rotation at a high speed so that, as indicated in the drawing, the initial outer convolutions of the path of flow of the gases are drawn downwardly so as to then reach a central whirling path of flow which is pulled upwardly by the suction of the blower 13. The gas which thus whirls centrally out of the lower cyclone 6 along the interior thereof adjacent its axis, mixes with the central upwardly whirling gases of the upper cyclone 5. These united gas streams, from the cyclones 5 and 6, then reach the main gas conduit 7 and flow from the latter into the pair of gas inlet conduits 8 and 9, in approximately equal amounts, into the pair of cyclones 10 and 11 of the upper stage of the drawing. These two cyclones again have the gases drawn therethrough in precisely the manner described above in connection with the cyclone separators 5 and 6. The gas streams which become united in the cyclone 10 issue out of the latter along the conduit 12 so as to then reach the blower 13 which finally discharges the gases out into the open atmosphere.

The pulverulent cement raw material which is supplied to the apparatus from the hopper 21, is immediately carried off, as soon as it leaves the supply pipe 22, by the gas flowing along the upper branch 8 into the upper cyclone 10, so that material issuing from the bottom of the supply pipe 22 is carried along into the upper cyclone 10 of the apparatus. In this way there is achieved, particularly in the cyclone 10 itself, an extremely good heat exchange from the gas to the pulverulent cement raw material. Within the cyclone 10 the pulverulent material will, as a result of centrifugal force, be thrown outwardly against the wall of the cyclone to slide downwardly along the inner surface thereof and reach in this way, in finely divided form, the lower cyclone 11 of the upper stage. In this lower cyclone 11 the pulverulent material is engaged by the tangentially entering portion of the gas which flows in through the inlet conduit 9, and again because of the centrifugal force the pulverulent material is thrown transversely through this part of the gas stream outwardly against the inner surface of the lower cyclone separator. In this way there is again provided an extremely good heat exchange from the gas to the pulverulent material.

The pulverulent material which slides downwardly along the inner surface of the lower cyclone 11 of the upper stage then reaches the discharge conduit 14 to flow through the latter into the upper branch 3 of the conduit 2, so as to be carried in suspension into the upper cyclone 5 with the gases flowing through the gas inlet inlet conduit 3 thereof. The pulverulent material centrifugally thrown against the inner surface of the upper cyclone 5 of the first stage, slides downwardly along the latter into the lower cyclone 6 of this stage in which it is again placed directly in heat-exchanging relationship with the part of the gases which enter into the lower cyclone 6 through the gas inlet conduit 4 communicating therewith.

As is apparent from the above description, the pulverulent cement raw material is brought at each heat-exchanging or treating stage sequentially in engagement with a pair of gas-streams, in contrast with the cyclone heating systems used up to the present time. In this way my invention provides the advantage of presenting to the pulverulent cement raw material at the lower cyclone of each stage, a renewed contact with the hot gas. Thus, with my invention a particularly effective use of the heat content of the hot gases issuing from the kiln is achieved for the purpose of providing a pre-heating as well as a deacidifying of the pulverulent cement raw material. It is possible to demonstrate both from calculations as well as experimentally that with the above-described system of my invention, the heat content of the waste gases streaming out of the upper treating stage through the conduit 12 in total is considerably less than the heat content of a conventional cyclone heating system having a pair of treating stages connected in series, one after the other. Thus, with my invention it is possible to achieve the desired results with a number of treating stages less than that required by a conventional cyclone heating system. Therefore, with my invention there is not only a particularly good use made of the available heat, but in addition the entire apparatus is extremely compact and does not require the relatively large height for this structure as is the case with conventional apparatus.

The pulverulent cement raw material issuing from lowest cyclone separators 6, situated nearest to the rotary kiln, is divided by the valve plate 18 into a pair of pulverulent material streams, one of which continues on into the rotary kiln and the other of which flows through the branch conduit 17 into the main gas supply conduit 2. The pulverulent cement raw material thus reaches the interior of the main gas conduit 2 in finely divided form so as to engage the gas in the conduit 2 in this condition and so as to be carried along in suspension in the gas issuing from the rotary kiln. At the upper part of the main conduit 2 the gas from the kiln together with the pulverulent cement raw material suspended therein is re-directed in the abovedescribed manner into the branches 3 and 4 which form the gas inlet conduits for the cyclones 5 and 6 of the first stage. A part of the pulverulent cement raw material discharged from the lower cyclone 6 thus continuously circulates through the pipe 17, the main gas conduit 2, the gas inlet branches 3 and 4, and the cyclones 5 and 6 of the first stage. Thus, in order to maintain equilibrium conditions by corresponding adjustment of the distributing plate 18, this plate is adjusted so as to direct through the branch 15 into the rotary kiln 1 the same amount of pulverulent cement raw material as is fed to the entire apparatus initially through the supply pipe 22. Therefore, by adjusting the plate 18 it is possible to regulate within a relatively wide range the ratio between the amount of pulverulent material which is continuously recirculated to the amount which is delivered to the rotary kiln 1.

The pulverulent raw material which is recirculated through the conduit 2 has already been heated to approximately 800° C. so that it already possesses the required calcining temperature. Therefore, there will be practically no further increase in the temperature of the pulverulent material in the conduit 2. The sensible heat of the hottest gases which are delivered directly from the kiln into the conduit 2 and which extend from the outlet end of the branch 17 up to the bottom end of the discharge conduit 14, benefit above all the extent of deacidifying of the pulverulent raw material. During each pass through this region, therefore, a considerable amount of carbonic acid is driven out of the pulverulent cement raw material. In this way, my invention assures that when the pulverulent cement raw material reaches the inlet of the rotary kiln it has already been deacidified to a considerable extent.

It is not essential that the apparatus of my invention be provided with a pair of treating or heat-exchanging stages, as described above and shown in the drawing. It is of course, also possible in many cases to provide only a single heat-exchanging stage. On the other hand, in order to achieve an extremely thorough use of the heat content of the waste gases, it may also be possible in some cases to provide more than two, such as for example, three heat-exchanging stages. Furthermore, it is also possible to construct each heating stage in such a way that it includes more than two, such as for example three cyclones arranged one above the other in such a way that each upper cyclone is in open communication with the next lower cyclone.

Finally, my invention is not limited to the heating of pulverulent cement raw material or similar ceramic material, but is instead of more general utility and can be used advantageously for heat-exchanging purposes between any pulverulent material and a gas. This heat-exchange can also be used for the purpose of cooling a hot pulverulent material with a cooling medium in gas form, such as air.

I claim:

1. In an apparatus for providing direct heat exchange between a pulverulent material and a gas, at least one heat-exchanging stage comprising at least two cyclone separators, one of which is an upper separator and the other of which is a lower separator situated beneath said upper separator, said upper separator having a bottom open end directly communicating with a top open portion of said lower separator, a pair of gas inlet conduits respectively communicating tangentially with upper portions of said separators, a main gas conduit communicating with both of said gas inlet conduits and from which said gas inlet conduits branch, supply means for supplying pulverulent material at least to that gas inlet conduit which communicates with said upper separator, discharge means communicating with a lower end of said lower separator for discharging the treated pulverulent material therefrom, and suction means communicating with an upper portion of said upper separator for drawing gases out of the latter.

2. In an apparatus as recited in claim 1, said separators having a common axis and said upper separator having a tapered lower wall portion terminating at its smallest end at the top end of said lower separator.

3. In an apparatus as recited in claim 1, said discharge means including a pair of branches for the pulverulent material discharging from said lower separator, one of said branches being a recirculating branch and leading directly into said main gas conduit for recirculating part of the treated pulverulent material through said heat-exchanging stage and the other of said branches directing the remainder of the pulverulent material to a predetermined location for further treatment thereof.

4. In an apparatus as recited in claim 3, valve means situated at the junction between the branches of said discharge means for regulating the proportional distribution of the pulverulent material between said latter branches.

5. In an apparatus as recited in claim 4, said valve means being manually adjustable.

6. In an apparatus for providing direct heat exchange between a pulverulent material and a gas, a plurality of heat-exchanging stages, each including at least two cyclone separators arranged one directly above the other so as to form upper and lower separators, said upper separator of each stage communicating directly at its bottom end with a top end of said lower separator, and said upper and lower separators being coaxially arranged, a plurality of gas inlet conduits respectively communicating tangentially with upper end portions of said separators of each stage, supply means communicating at least with the upper gas inlet conduit of each stage for supplying thereto pulverulent material to be treated, the lower separator of each stage having a bottom discharge end through which the pulverulent material discharges and said bottom discharge end of a given lower separator of a given stage communicating with the supply means of the next-preceding stage in the direction of gas flow, for delivering pulverulent material thereto to be further treated, main gas conduit means communicating with said gas inlet conduits and from which said gas inlet conduits branch, said main gas conduit means extending from the upper separator of one stage to the gas inlet conduits of the next stage and including an initial supply portion supplying gas to the gas inlet conduits of the first stage in the direction of gas flow, and discharge conduit means communicating with the bottom discharge end of the lower separator of the first stage in the direction of gas flow for discharging pulverulent material therefrom.

7. In an apparatus as recited in claim 6, said discharge conduit means including a pair of branches one of which leads directly into said supply portion of said main gas conduit means for recirculating part of the pulverulent material through said first stage.

8. In an apparatus for providing direct heat exchange between the waste gases of a rotary calcining kiln and a pulverulent cement raw material, at least one heat-exchanging stage including at least two cyclone separators one of which is located above the other and forms an upper separator and the other of which is situated below said upper separator and forms a lower separator, a main gas conduit leading from the rotary kiln and having a pair of branches communicating tangentially with upper ends of said separators to form gas inlet conduits therefor, supply means communicating at least with said gas inlet conduit of said upper separator for supplying pulverulent material thereto, suction conduit means communicating with said upper separator for sucking gas out of the latter, said upper separator having an open bottom end communicating freely with an open top end of said lower separator so that said suction conduit means also sucks gas out of said lower separator into said upper separator, and discharge conduit means communicating with a lower portion of said lower separator and leading therefrom back to said kiln for directing the pulverulent material thereto, said discharge conduit means including a branch which communicates with said main gas conduit for recirculating part of the pulverulent material so as to drive off carbonic acid therefrom.

References Cited
UNITED STATES PATENTS 3,135,588   6/1964   Helming _____ 34—57
3,212,764  10/1965   Muller et al. _____ 263—32

FOREIGN PATENTS 939,745   10/1963   Great Britain.

FREDERICK L. MATTESON, JR., *Primary Examiner.*

JOHN J. CAMBY, *Examiner.*